United States Patent
Dong et al.

(10) Patent No.: US 10,186,995 B2
(45) Date of Patent: Jan. 22, 2019

(54) ROTATING SWITCHING STRATEGY FOR POWER CONVERTERS

(71) Applicant: General Electric Company, Schenectady, NY (US)

(72) Inventors: Dong Dong, Schenectady, NY (US); Robert Gregory Wagoner, Roanoke, VA (US); Govardhan Ganireddy, Bangalore (IN); Ravisekhar Nadimpalli Raju, Clifton Park, NY (US); Rui Zhou, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/405,752

(22) Filed: Jan. 13, 2017

(65) Prior Publication Data
US 2018/0205334 A1  Jul. 19, 2018

(51) Int. Cl.
*H02M 7/493* (2007.01)
*H02P 9/00* (2006.01)
(Continued)

(52) U.S. Cl.
CPC .............. *H02P 9/007* (2013.01); *H02J 3/382* (2013.01); *H02J 3/383* (2013.01); *H02J 3/386* (2013.01);
(Continued)

(58) Field of Classification Search
CPC .............. H02M 7/493; H02M 7/4822; H02M 7/53876; H02M 7/53878;
(Continued)

(56) References Cited

U.S. PATENT DOCUMENTS 5,638,263 A    6/1997  Opal et al.
5,896,909 A    11/1999 Hammond et al.
(Continued)

FOREIGN PATENT DOCUMENTS

JP    2014039419 A    2/2014
WO   2014066783 A2    5/2014

OTHER PUBLICATIONS

K. Acharya, M. Tahir, and S. Mazumder, "Communication fault-tolerant wireless network control of a load-sharing multiphase interactive power network," in PESC Record—IEEE Annual Power Electronics Specialists Conference, 37th IEEE Power Electronics Specialists Conference, Jun. 2006.*
(Continued)

*Primary Examiner* — Jue Zhang
*Assistant Examiner* — Jye-June Lee
(74) *Attorney, Agent, or Firm* — GE Global Patent Operation; Nitin Joshi

(57) ABSTRACT

Systems and methods for operating a power converter with a plurality of inverter blocks with silicon carbide MOSFETs are provided. A DC to AC converter can include a plurality of inverter blocks. Each inverter block can include a plurality of switching devices. A control method can include identifying one of a plurality of switching patterns for operation of the inverter block for each inverter block. Each switching pattern can include a plurality of switching commands. The control method can further include controlling each inverter block based on the identified switching pattern for the inverter block. The control method can further include rotating the switching patterns among the plurality of inverter blocks.

16 Claims, 7 Drawing Sheets

(51) Int. Cl.
*H02J 3/38* (2006.01)
*H02K 7/18* (2006.01)
*H02M 5/458* (2006.01)
*H02M 1/00* (2006.01)

(52) U.S. Cl.
CPC ............ *H02K 7/183* (2013.01); *H02M 5/458* (2013.01); *H02M 5/4585* (2013.01); *H02M 7/493* (2013.01); *H02M 2001/0048* (2013.01)

(58) Field of Classification Search
CPC ......... H02M 2007/53876; H02M 2007/53878; H02J 3/386; H02P 9/007
See application file for complete search history.

(56) References Cited

U.S. PATENT DOCUMENTS

| | | | |
|---|---|---|---|
| 6,031,738 | A | 2/2000 | Lipo et al. |
| 6,222,284 | B1 | 4/2001 | Hammond et al. |
| 6,697,271 | B2 | 2/2004 | Corzine |
| 6,781,351 | B2 | 8/2004 | Mednik et al. |
| 7,568,931 | B2 | 8/2009 | Hammond |
| 7,710,082 | B2 | 5/2010 | Escobar Valderrama et al. |
| 7,800,254 | B2 | 9/2010 | Hammond |
| 8,008,923 | B2 | 8/2011 | Hammond |
| 8,093,764 | B2 | 1/2012 | Hammond |
| 8,207,812 | B2 | 6/2012 | Roc et al. |
| 8,441,147 | B2 | 5/2013 | Hammond |
| 8,619,446 | B2 | 12/2013 | Liu et al. |
| 8,988,860 | B2 | 3/2015 | Hammond |
| 9,184,673 | B2 | 11/2015 | Mihalache |
| 9,277,683 | B2 | 3/2016 | Ionescu et al. |
| 9,318,975 | B2 * | 4/2016 | Venhaus ............... H02M 7/537 |
| 9,407,165 | B2 | 8/2016 | Wu et al. |
| 2008/0304302 | A1 | 12/2008 | Wagoner et al. |
| 2010/0014325 | A1 * | 1/2010 | Raju .................... H02M 5/271 363/37 |
| 2012/0013372 | A1 | 1/2012 | Campbell et al. |
| 2012/0134189 | A1 | 5/2012 | Krein |
| 2012/0218795 | A1 | 8/2012 | Mihalache |
| 2015/0340964 | A1 | 11/2015 | Modeer |
| 2017/0093299 | A1 * | 3/2017 | Norimatsu ............. H02M 7/49 |

OTHER PUBLICATIONS

Song C, Zhao R, Lin W, et al. "A novel control strategy for input-parallel-output-series inverter system," Electrical Machines and Systems (ICEMS), 2011 International Conference on. IEEE, 2011: 1-5.*

PCT Search Report and Written Opinion issued in connection with corresponding PCT Application No. PCT/US2017/067640 dated Apr. 16, 2018.

Li et al., "Capacitor Voltage Control in a Cascaded Multilevel Inverter as a Static Var Generator", Power Electronics and Motion Control Conference, 2006. IPEMC 2006. CES/IEEE 5th International, pp. 1-5, Aug. 14-16, 2006, Shanghai.

Zhao et al., "Voltage and Power Balance Control for a Cascaded H-Bridge Converter-Based Solid-State Transformer", IEEE Transactions on Power Electronics, vol. 28, Issue: 4, pp. 1523-1532, Apr. 2013.

Tripathi et al., "Control and performance of a single-phase dual active half bridge converter based on 15kV SiC IGBT and 1200V SiC MOSFET", Applied Power Electronics Conference and Exposition (APEC), 2014 Twenty-Ninth Annual IEEE, pp. 2120-2125, Mar. 16-20, 2014, Fort Worth, TX.

* cited by examiner

US 10,186,995 B2

ROTATING SWITCHING STRATEGY FOR POWER CONVERTERS

STATEMENT REGARDING FEDERALLY SPONSORED RESEARCH & DEVELOPMENT

This invention was made with Government support under contract number DE-EE0007252 awarded by the Department of Energy. The Government has certain rights in the invention.

FIELD

The present subject matter relates generally to power systems, and more particularly to systems and methods for a rotating switching strategy to reduce the overall electrical losses and also to balance power losses in power converters modular cascaded H-bridges with high frequency transformers.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a control method for operating a DC to AC converter. The DC to AC converter can include a plurality of inverter blocks. Each inverter block can include one or more silicon carbide MOSFETs. The control method can include, for each inverter block, identifying one of a plurality of switching patterns for operation of the inverter block. Each switching pattern can include a plurality of switching commands. The control method can include controlling each inverter block based on the identified switching pattern for the inverter block. The control method can include rotating the switching patterns among the plurality of inverter blocks.

Another example aspect of the present disclosure is directed to a power conversion system. The power conversion system can include a DC to AC converter comprising a plurality of inverter blocks. Each inverter block can include one or more silicon carbide MOSFETs. The power conversion system can also include a control system configured to control operation of the DC to AC converter. The control system can be configured to identify one of a plurality of switching patterns for operation of each inverter block. Each switching pattern can include a plurality of switching commands. The control system can further be configured to control each inverter block based on the identified switching pattern for the inverter block. The control system can further be configured to rotate the switching patterns among the plurality of inverter blocks.

Another example aspect of the present disclosure is directed to a wind power generation system. The wind power generation system can include a wind power generator configured to generate AC power and an AC to DC converter coupled to the wind power generator. The AC to DC converter can be configured to convert the AC power from the wind power generator to a DC power. The wind power generation system can also include a DC link coupled to the AC to DC converter. The DC link can be configured to receive DC power from the AC to DC converter. The wind power generation system can also include a DC to AC converter coupled to the DC link. The DC to AC converter can be configured to receive DC power from the DC link. The DC to AC converter can include a plurality of inverter blocks. Each inverter block can include one or more silicon carbide MOSFETs. The wind power generation system can also include a control system configured to control operation of the DC to AC converter. The control system can be configured to identify one of a plurality of switching patterns for operation of each inverter block. Each switching pattern can include a plurality of switching commands. The control system can further be configured to control each inverter block based on the identified switching pattern for the inverter block. The control system can further be configured to rotate the switching patterns among the plurality of inverter blocks.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
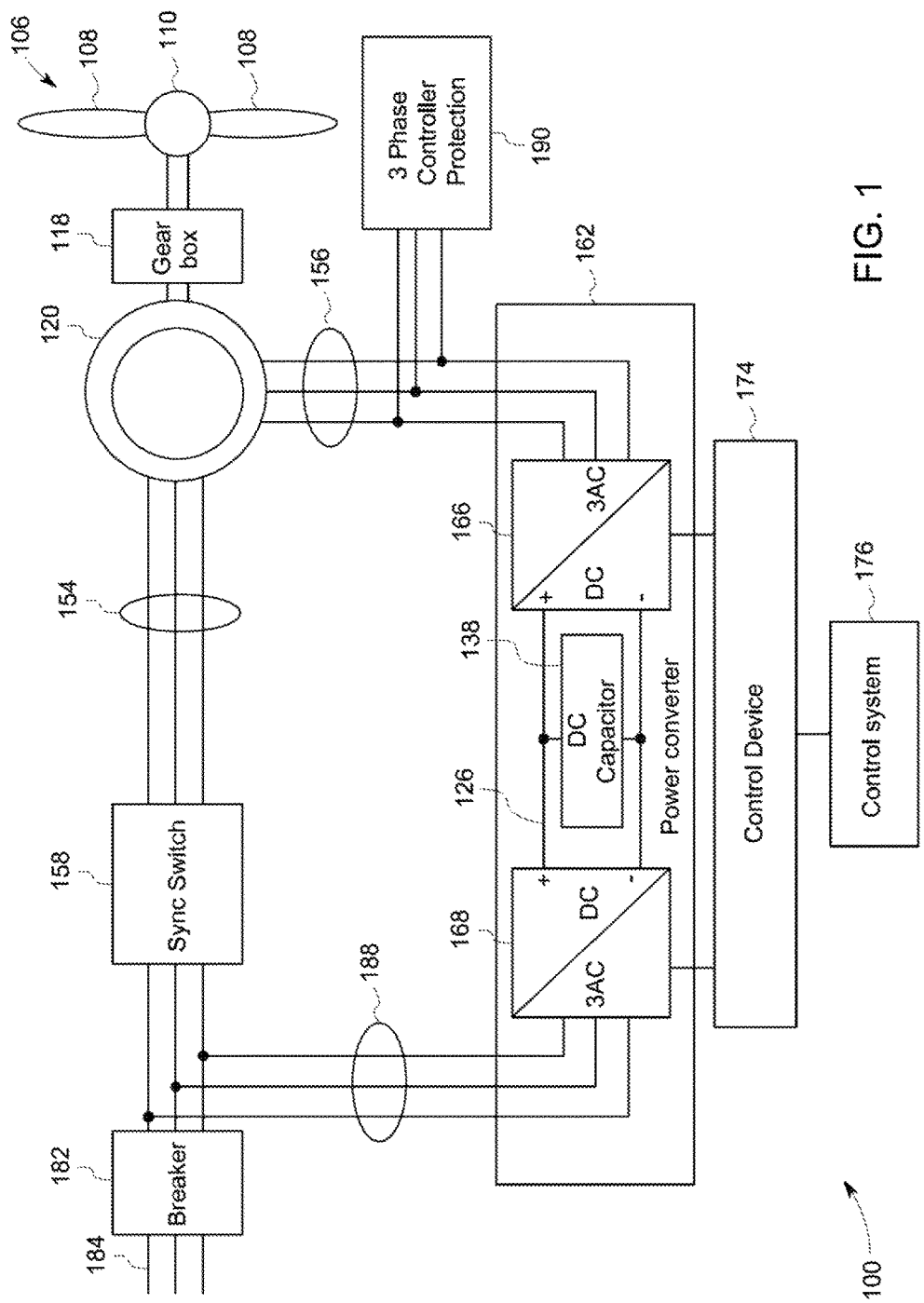
FIG. 1 depicts an example wind power generation system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for a rotating switching strategy for a power converter utilizing SiC MOSFETs. For example, power generation systems, such as systems using doubly fed induction generators ("DFIGs") as power generation units, can use one or more power converters to convert power from a low voltage multiphase alternating current power into a medium voltage multiphase alternating current power. As used herein, "LV" voltage can be a power less than about 1.5 kilovolts. As used herein, "MV" voltage can be power greater than about 1.5 kilovolts and less than about 100 kilovolts. As used herein, the term "about" can mean within 20% of the stated value.

In an embodiment, the power converter can be a multiphase (e.g., three phase) power converter configured to convert a multiphase power output from a power generator. The power converter can include, for example, a first power converter configured to convert an AC power output from a power generator, such as a DFIG, into a DC power, and provide the DC power to a DC link. A second power converter can be configured to convert the DC power from the DC link into an AC power suitable for use on energy grid. For example, the second power converter can be a DC to DC to AC power converter, and can utilize SiC MOSFETs as the power semiconductors, thereby allowing very high switching frequency.

The second power converter can include, for example, a plurality of inverter blocks. Each inverter block can include a plurality of bridge circuits configured to convert power, and each bridge circuit can include one or more SiC MOSFETs as switching devices. For example, each inverter block can be a DC to DC to AC inverter block, and a plurality of inverter blocks can be coupled in parallel on a LV side and coupled in series on a MV side. Each DC to DC to AC inverter block can include a first DC to AC conversion entity configured to convert LV DC power from the DC link to a high frequency LV AC voltage, an isolation transformer configured to provide isolation, a second AC to DC conversion entity configured to convert the LV AC power to a LV DC power, and a third DC to AC conversion entity configured to convert the LV DC power to an LV AC power suitable for use on an energy grid. A plurality of inverter blocks can be connected in series to build a MV AC voltage suitable for use on a MV AC grid.

In a popular modulation strategy, the inverter blocks can be configured in a cascaded H-bridge topology, wherein each inverter block is controlled using a switching pattern to operate the switching devices in the inverter block. For example, in a cascaded H-bridge topology, the switching angle for each inverter block can be predetermined in order to get an expected waveform of the output of the power converter. As each inverter block is switched on and off, the inverter block can contribute to the output waveform provided by the power converter. However, in such a cascaded H-bridge topology, the power processed by individual inverter blocks may not be equal.

For example, a first inverter block in a power converter may be controlled using a switching pattern in which the first inverter block is the first inverter block to be turned on. Conversely, a second inverter block in a power converter may be controlled using a switching pattern in which the second inverter block is the last inverter block to be turned on. In such a configuration, the first inverter block may process more power than the second inverter block. As a result, the losses across the individual inverter blocks, as well as the temperatures of the inverter blocks in a power converter, may be unbalanced. Further, a thermal constraint of an individual inverter block which processes more power than other inverter blocks in the power converter may therefore be a limiting constraint on the power converter. Additionally, because the losses in an inverter block can be due to resistive heating of elements in the inverter block, the thermal loading on an inverter block that processes more power than other inverter blocks is likely to be higher than the thermal loading on other inverter blocks. In such a configuration, a cooling system for the power converter may have to account for the unbalanced thermal loading across the individual inverter blocks or be designed to provide sufficient cooling to all inverter blocks based on the thermal loading of the inverter block that processes the most power.

Example aspects of the present disclosure are directed to systems and methods of rotating a switching pattern among inverter blocks in a power converter to more evenly balance power conversion in the power converter. For example, the systems and methods according to example aspects of the present disclosure can allow for a plurality of switching patterns to be rotated among a plurality of inverter blocks in a power converter. For example, a control device can identify one of a plurality of switching patterns for control of operation of each inverter block. Each switching pattern can include a plurality of switching commands to operate one or more switching devices in the inverter block. The switching devices can be, for example, SiC MOSFETs. The control device can further control each inverter block based on the identified switching pattern for each inverter block. For example, the control device can provide one or more switching commands to each inverter block such that the inverter block is switched according to the switching pattern that has been identified for the inverter block. Further, the control device can rotate the switching patterns among the plurality of inverter blocks.

For example, a power converter can include six inverter blocks, a first inverter block, a second inverter block, a third inverter block, a fourth inverter block, a fifth inverter block, and a sixth inverter block. Further, the control device can identify six switching patterns to control switching of the six inverter blocks of the power converter. Each inverter block can be controlled based on the identified switching pattern for the inverter block. For example, a first inverter block can be controlled according to a first switching pattern, a second inverter block can be controlled according to a second switching pattern, and so on. According to example aspects of the present disclosure, the switching patterns can be rotated among the plurality of inverter blocks.

For example, in an embodiment, the switching patterns can be rotated among all of the inverter blocks, such as by rotating the first switching pattern to the second inverter block, the second switching pattern to the third inverter block, the third switching pattern to the fourth inverter block, and so on. At each rotation interval, the switching patterns for the inverter blocks can be rotated to the next successive inverter block. In another embodiment, two switching patterns can be rotated between two inverter blocks in a power converter. For example, a first switching pattern can be rotated from a first inverter block to a sixth inverter block, while the sixth switching pattern can be rotated from the sixth inverter block to the first inverter block. Similarly, the second inverter block and the fifth inverter block and the third inverter block and the fourth inverter block can rotate their switching patterns. At the next successive rotation interval, the inverter blocks can rotate the switching patterns back. For example, a first switching pattern can be rotated from the sixth inverter block back to the first inverter block, and the sixth switching pattern can be rotated from the first inverter block back to the sixth inverter block. Other rotating switching pattern configurations can similarly be used.

In an embodiment, the switching pattern for at least one inverter block of the plurality of inverter blocks can be a pulse width modulation ("PWM") switching pattern to regulate the line current from the DC to AC converter. Further, the switching patterns for all other inverter blocks which are not in a PWM switching pattern can be switching patterns that include switching commands to output either a zero voltage or a full positive or negative voltage by the inverter block. Thus, one or more inverter blocks can regulate line current while all other inverter blocks in a power converter can be switched on and off to contribute to the overall voltage of the power converter.

In an embodiment, the switching patterns can be rotated among the plurality of inverter blocks every half cycle. For example, the switching patterns between two inverter blocks can be switched between the two inverter blocks every half cycle, or the switching patterns can be successively rotated between all inverter blocks at every half cycle.

In an embodiment, a control device can receive one or more signals indicative of a temperature of one or more inverter blocks in the plurality of inverter blocks. For example, one or more temperature sensors can be configured to measure the temperature of each inverter block. The temperature sensors can provide a temperature measurement to a control device, which can then rotate the switching patterns among the plurality of inverter blocks based at least in part on the one or more signals indicative of a temperature of the one or more inverter blocks. For example, if a particular inverter block is operating at a higher temperature than all other inverter blocks in the power converter, a control device can rotate the switching patterns among the plurality of inverter blocks such that the inverter block operating at the higher temperature can be controlled by a switching pattern to reduce the temperature of the inverter block, such as by controlling the inverter block with a switching pattern that processes less power than the other switching patterns in the plurality of switching patterns.

In an embodiment, the switching patterns can be rotated among the plurality of inverter brought blocks such that the average power process by each inverter block is approximately equal. As used herein, the term "approximately" means within plus or minus ten percent of the stated value. For example, the plurality of switching patterns can be rotated among the plurality of inverter block such that each inverter block is controlled using each switching pattern in the plurality of switching patterns for approximately the same amount of time. In such a configuration, each inverter block will process approximately the same amount of power as all the other inverter blocks in the power converter.

In this way, the systems and methods according to example aspects of the present disclosure can have a technical effect of allowing for balancing power losses across inverter blocks in a power converter. Further, this can normalize the average power handled and the thermal loading among the inverter blocks. Additionally, this can help to ensure that a power converter is not limited by a thermal constraint from a single inverter block in the power converter, which can allow for all inverter blocks to be operated at an increased power rating while meeting the thermal constraints of the inverter blocks. Moreover, this can reduce the number of inverter blocks needed to meet a specific power rating for a power converter, which can increase the reliability of the power converter by reducing the number of components in the system.

With reference now to the figures, example aspects of the present disclosure will be discussed in greater detail. FIG. 1 depicts a wind power generation system 100 according to example aspects of the present disclosure, which includes a DFIG 120. The present disclosure will be discussed with reference to the example wind power generation system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example wind power generation system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to an electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188. An auxiliary power feed (not depicted) can be coupled to the line side bus 188 to provide power for components used in the wind power generation system 100, such as fans, pumps, motors, and other components.

In example configurations, the rotor side converter 166 and/or the line side converter 168 are configured for normal operating mode in a three-phase, pulse width modulation (PWM) arrangement using SiC MOSFETs and/or IGBTs as switching devices. SiC MOSFETs can switch at a very high frequency as compared to conventional IGBTs. For example, SiC MOSFETs can be switched at a frequency from approximately 0.01 Hz to 10 MHz, with a typical switching frequency of 1 KHz to 400 KHz, whereas IGBTs can be switched at a frequency from approximately 0.01 Hz to 200 KHz, with a typical switching frequency of 1 KHz to 20 KHz. Additionally, SiC MOSFETs can provide advantages over ordinary MOSFETs when operated in some voltage ranges. For example, in power converters operating at 1200V-1700V on the LV side, SiC MOSFETs have lower switching losses than ordinary MOSFETs.

In some implementations, the rotor side converter 166 and/or the line side converter 168 can include a plurality of conversion modules, each associated with a phase of the multiphase power output of the power generator, as will be discussed in more detail with respect to FIGS. 2 and 3. The rotor side converter 166 and the line side converter 168 can be coupled via a DC link 126 across which can be a DC link capacitor 138.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus 154 side, sinusoidal multiphase (e.g. three-phase) is provided to the power delivery point (e.g., electrical grid 184). In particular, the AC power provided via the stator bus 154 can be a medium voltage ("MV") AC power. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. The rotor side power converter 166 converts the LV AC power provided from the rotor bus 156 into DC power and provides the DC power to the DC link 126. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a wind power generation system 100, the power converter 162 can be configured to convert the LV AC power to MV AC power. For example, the line side converter 168 can convert the LV DC power on the DC link 126 into a MV AC power suitable for the electrical grid 184. In particular, SiC MOSFETs used in bridge circuits of the line side power converter 168 can be modulated to convert the DC power on the DC link 126 into AC power on the line side bus 188. SiC MOSFETs can be operated at a higher switching frequency than conventional IGBTs. In addition, one or more isolation transformers coupled to one or more of the bridge circuits can be configured to step the voltage from the DC link up or down as needed. Additionally, a plurality of inverter blocks can be connected in series on the MV side to collectively step up the voltage of the power on the DC link 126 to a MV AC power. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power.

Various circuit breakers and switches, such as breaker 182, stator sync switch 158, etc. can be included in the wind power generation system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the wind power generation system 100 or for other operational considerations. Additional protection components can also be included in the wind power generation system 100. For example, as depicted in FIG. 1, a multiphase crowbar circuit 190 can be included to protect against an overvoltage condition damaging circuits of the wind power generation system 100.

The power converter 162 can receive control signals from, for instance, the control system 176 via the control device 174. The control signals can be based, among other things, on sensed conditions or operating characteristics of the wind power generation system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated.

Figure 2:
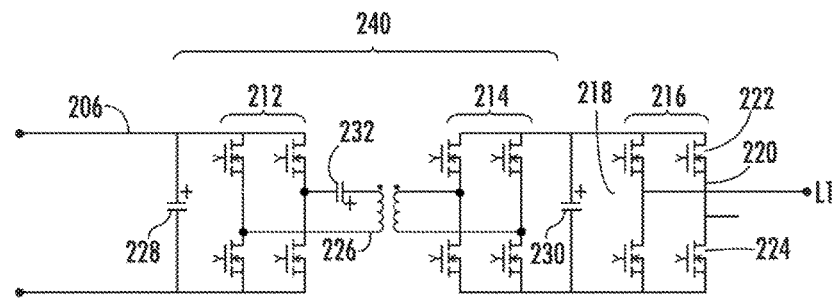
FIG. 2 depicts example elements for use in a power converter according to example aspects of the present disclosure.

Referring now to FIG. 2, a topology of a component in a DC to DC to AC converter is depicted. FIG. 2 depicts an example DC to DC to AC inverter block 206, which can be included in a conversion module 200 of a line side converter 168, as depicted in FIG. 3. Each inverter block 206 can include a plurality of conversion entities. For instance, inverter block 206 can include first conversion entity 212, a second conversion entity 214, and a third conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFETs, which can be operated at higher switching frequencies than conventional IGBTs. The switching devices can also be conventional IGBTs and/or MOSFETs. As shown, inverter block 206 further includes an isolation transformer 226. The isolation transformer 226 can be coupled to conversion entity 212 and conversion entity 214. As shown, the inverter block 206 can further include capacitors 228 and 230. For example, a capacitor 230 can be connected across a DC link between second conversion entity 214 and third conversion entity 216.

First conversion entity 212, isolation transformer 226, and second conversion entity 214 can together define an inner converter 240. Inner converter 240 can be operated to convert a LV DC power from the DC link 126 to a LV DC power. In an embodiment, inner converter 240 can be a high-frequency resonant converter. In a resonant converter configuration, a resonant capacitor 232 can be included in inner converter 240. In various embodiments, a resonant capacitor 232 can be included on a DC link side of the isolation transformer 226 as depicted in FIG. 2, on a grid side of the isolation transformer 226 (not depicted), or on both the DC link and grid sides of the isolation transformer 226 (not depicted). In another embodiment, inner converter 240 can be a hard-switched converter by removing the resonant capacitor 232. Third conversion entity 216 can also be referred to as an outer converter 216. Outer converter 216 can convert a LV DC power from the inner converter to a LV AC power suitable for use on an energy grid 184. In a typical application, outer converter 216 can be a hard-switched converter, and therefore not include a resonant capacitor.

Figure 3:
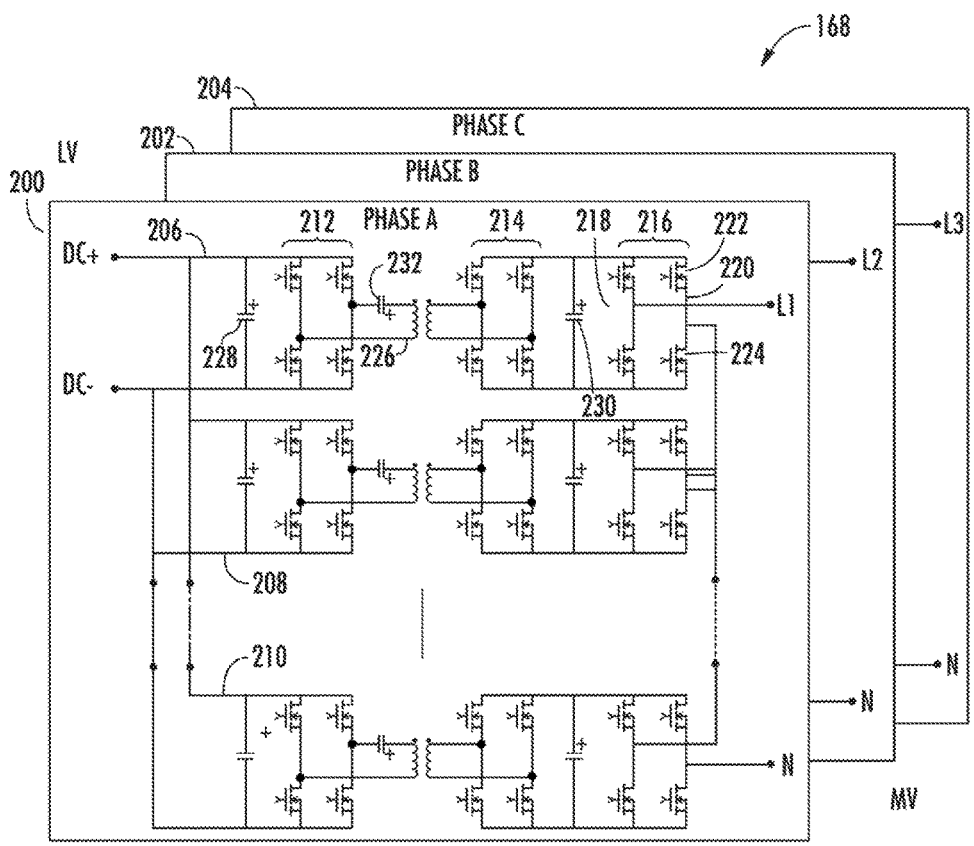
FIG. 3 depicts an power converter according to example aspects of the present disclosure.

FIG. 3 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the electrical grid 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210. For instance, as shown, conversion module 200 includes inverter blocks 206, inverter block 208, and inverter block 210. In an embodiment, each conversion module 200-204 can include any number of inverter blocks 206-210. The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the electrical grid 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the electrical grid 184. A plurality of inverter blocks can be connected in series to build a MV AC voltage suitable for use on a MV AC energy grid.

The inverter blocks 206-210 can be configured to contribute to the overall MV AC power provided by the conversion module 200. In this manner, any suitable number of inverter blocks can be included within the conversion modules 200-204. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the SiC MOSFETs and/or IGBTs to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more conversion entities as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Figure 4:
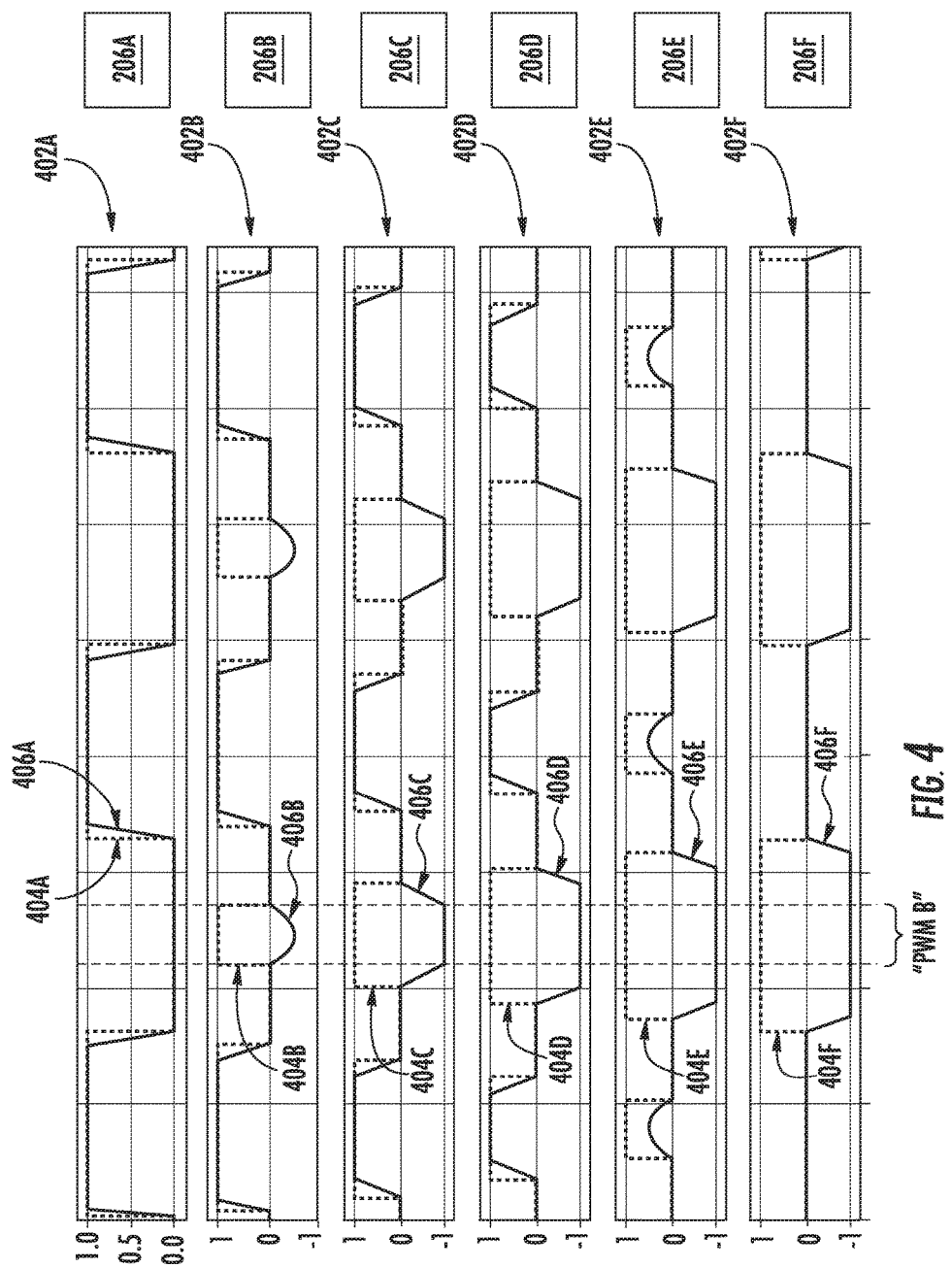
FIG. 4 depicts an example switching strategy according to example aspects of the present disclosure.

Referring now to FIG. 4, an example switching strategy according to example aspects of the present disclosure is depicted. FIG. 4 depicts a plurality of switching patterns which have been identified for a plurality of inverter blocks in a power converter. For example, a power converter, such as a line side converter 168, can include a plurality of inverter blocks, such as inverter blocks 206-210 depicted in FIGS. 2 and 3. As depicted, a power converter can include six inverter blocks, with each inverter block receiving and identified switching pattern 402. In an embodiment, a power converter can include two or more inverter blocks. For example, as depicted, a first inverter block 206A can have a first identified switching pattern 402A, a second inverter block 206B have a second identified switching pattern 402B, a third inverter block 206C can have a third identified switching pattern 402C, a fourth inverter block 206D can have a fourth identified switching pattern 402D, a fifth inverter block 206E can have a fifth identified switching pattern 402E, and a sixth inverter block 206F can have a sixth identified switching pattern 402F. In this way, a plurality of inverter blocks can each have an identified switching pattern from a plurality of switching patterns.

Each identified switching pattern 402 can include a plurality of gating commands. For example, an identified switching pattern 402A for a first inverter block can include an inner converter on/off command 404A for an inner converter 240 the first inverter block. The inner converter on/off command 404A can be used to control operation of switching devices, such as SiC MOSFETs, in an inner converter 240 such that power flows through the inner converter 240. For example, a "1" command can be a command to flow power through the inner converter (i.e., turn the inner converter on), and a "0" command can be a command to stop power flow through the inner converter (i.e., turn the inner converter off). Each identified switching pattern 402A-F can include an associated inner converter on/off command 404A-F, respectively.

Further, each identified switching pattern 402A-F can include an outer converter duty cycle command 406 to an outer converter, such as an outer converter 216. For example, first identified switching pattern 402A for a first inverter block 206A can include a first outer converter duty cycle command 406A to control an output voltage of an outer converter 216. For example, when an outer converter duty cycle command 406A is greater than 0, the outer converter 216 of the first inverter block 206 A can provide a positive terminal voltage. If the outer converter duty cycle command 406A is less than zero, the outer converter 216 can provide a negative terminal voltage. The terminal voltage of the outer converter 216 of the first inverter block 206A can equal the duty cycle of the outer converter 216 multiplied by the DC link voltage from the output of the inner converter 240 in the first inverter block 206A ("Vdc"). Thus, when the outer converter duty cycle command 406A is +1, the terminal voltage for the first inverter block can be +Vdc, and when the outer converter duty cycle command 406A is −1, the terminal voltage for the first inverter block can be −Vdc. Similarly, the outer converter duty cycle command 406B-F can be used to control an outer converter terminal voltage from each outer converter 216 in the second through sixth inverter blocks 206B-F. Each of the inner convert on/off command 404 and the outer converter duty cycle command 406 can thus include a plurality of gating commands in a switching pattern 402.

In an embodiment, the identified switching pattern 402 for at least one inverter block 206 can be in a PWM switching pattern to regulate the line current from the DC to AC converter. Further, the identified switching pattern 402 for all other inverter blocks 206 which are not provided a PWM switching pattern can be a switching pattern including switching commands to output either a zero voltage or a full positive or negative voltage by the inverter block 206. For example, as depicted in FIG. 4, only one inverter block 206 at any point in time is provided a PWM switching pattern. For example, in identified switching pattern 402B provided to a second inverter block 206B, an outer converter duty cycle command 406B is in a PWM pattern when the outer duty cycle command 406B is a duty cycle that does not comprise a full voltage (either positive or negative) or zero duty cycle command. As shown, during the period of time that the outer converter duty cycle command 406B is non zero, identified as time period "PWM B", all other outer converter duty cycle commands 406A, and 406C-F comprise either a full voltage (positive or negative) or zero voltage duty cycle command. Thus, at any point in time, at least one inverter block 206 can be regulating a line current from the DC to AC converter.

Figure 5:
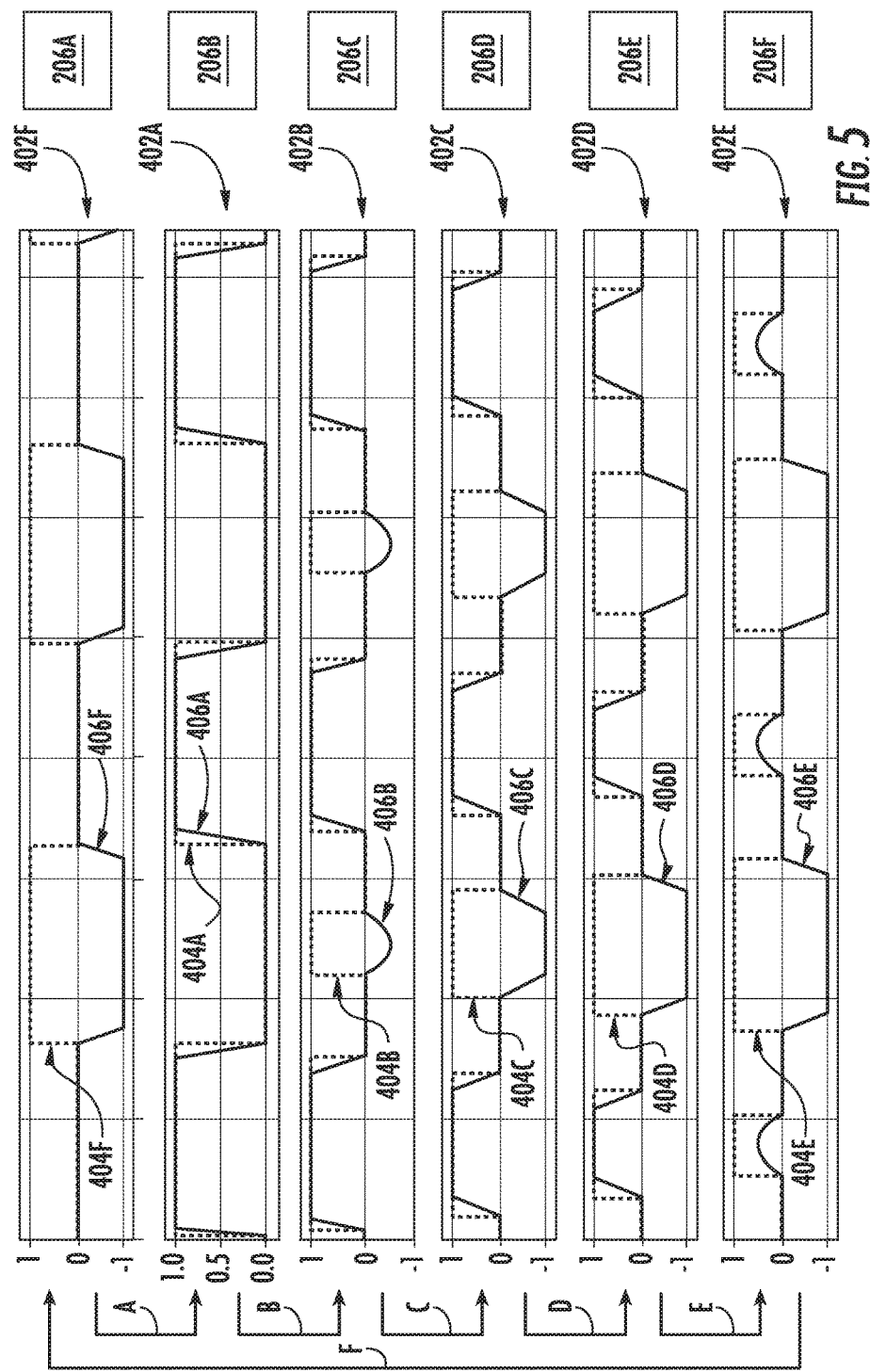
FIG. 5 depicts an example switching strategy according to example aspects of the present disclosure.

Referring now to FIG. 5, an example switching strategy according to example aspects of the present disclosure is depicted. FIG. 5 depicts a plurality of switching patterns which have been identified for a plurality of inverter blocks in a power converter. Elements that are the same or similar to those in FIG. 4 are referred to with the same reference numerals.

As shown in FIG. 5, each identified switching pattern 402A-F can be used to control an associated inverter block. However, as shown in FIG. 5, the switching commands, such as inner converter on/off command 404 and outer converter duty cycle command 406, have been rotated among the plurality of inverter blocks 206. For example, as noted by arrow "A," first inner converter on/off command 404A and first outer converter duty cycle command 406A have been rotated from first inverter block 206A to second inverter block 206B. Similarly, as indicated by arrows B-F, identified switching patterns 402B-F have been rotated to inverter blocks 206C-F and A, respectively. The identified switching patterns 402 can be rotated among the plurality of inverter blocks at a designated rotation interval, such as every half cycle. Further, at each successive rotation interval, such as at every half cycle, the identified switching patterns 402 can be rotated to another successive inverter block. For example, at successive half cycles, first identified switching pattern 402A can rotate from first inverter block 206A to second inverter block 206B, to third inverter block 206C, to fourth inverter block 206D, to fifth inverter block 206E, to sixth inverter block 206F, and back to first inverter block 206A. Similarly, second-sixth identified switching patterns 402B-F can rotate through the inverter blocks 206A-F. In this way, the identified switching patterns can be rotated among a plurality of inverter blocks.

Figure 6:
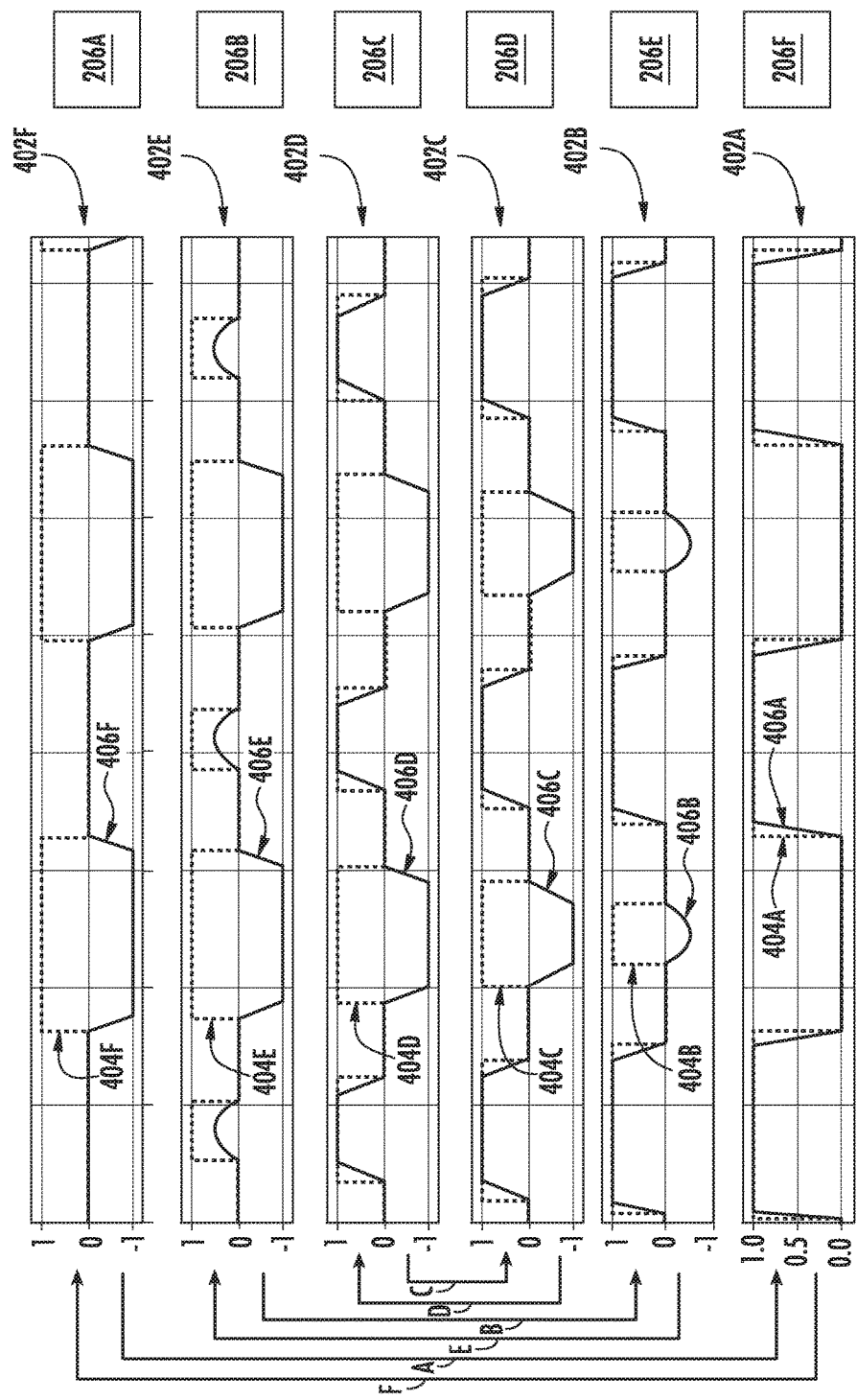
FIG. 6 depicts an example switching strategy according to example aspects of the present disclosure.

Referring now to FIG. 6, an example switching strategy according to example aspects of the present disclosure is depicted. FIG. 6 depicts a plurality of switching patterns which have been identified for a plurality of inverter blocks in a power converter. Elements that are the same or similar to those in FIGS. 4 and 5 are referred to with the same reference numerals.

As shown in FIG. 6, each identified switching pattern 402A-F can be used to control an associated inverter block. However, as shown in FIG. 5, the switching commands, such as on/off command 404 and outer converter duty cycle command 406, have been rotated among the plurality of inverter blocks 206A-F such that the identified switching patterns for inverter blocks 206A and 206F, inverter blocks 206B and 206E, and inverter blocks 206C and D have been switched. For example, as indicated by arrow "A," first inner converter on/off command 404A and first outer converter duty cycle command 406A have been rotated from first inverter block 206A to sixth inverter block 206F, whereas as indicated by arrow "F," sixth inner converter on/off command 406F and sixth outer converter duty cycle command 406F have been rotated from sixth inverter block 206F to first inverter block 206A. Similarly, as indicated by arrows B and E, identified switching patterns 402B and E have been rotated among second and fifth inverter blocks 206B and E, and as indicated by arrows C and D, identified switching patterns 402C and D have been rotated among third and fourth inverter blocks 206C and D. The identified switching patterns 402 can be rotated among the plurality of inverter blocks at designated rotation intervals, such as every half cycle. Further, at each successive rotation interval, such as at every half cycle, the identified switching patterns 402 can be rotated back to the previous inverter block. For example, at successive half cycles, first identified switching pattern 402A can rotate from first inverter block 206A to sixth inverter block 206F, and back to first inverter block 206A. Each identified switching pattern 402 can thereby rotate between two or more identified inverter blocks. For example, each identified switching pattern 402 can be rotated between two inverter blocks 206 at regular rotation intervals, as depicted in FIG. 6. In this way, the identified switching patterns can be rotated among a plurality of inverter blocks.

Referring generally to FIGS. 4-6, the identified switching patterns 402 can be rotated among the plurality of inverter blocks based on one or more parameters. For example, in an embodiment, the switching patterns can be rotated among the plurality of inverter blocks such that average power processed by each inverter block is approximately equal. For example, each inverter block could, on average, be controlled by each switching pattern in the plurality of switching patterns for an approximately equal time period, such as if each switching pattern is rotated through each inverter block in power converter. However, other rotating strategies can similarly be used, such as by rotating two subsets of the plurality of switching patterns among two subsets of inverter blocks, wherein the subsets of switching patterns process approximately equal power, or other rotating switching strategies. In this way, the identified switching patterns can be rotated among the plurality of inverter blocks such that the average power processed by each inverter block is approximately equal.

In an embodiment, one or more temperature sensors can be configured to measure a temperature associated with one or more inverter blocks. For example, a plurality of sensors can be configured to sense a temperature associated with each inverter block in a power converter, and can be configured to provide one or more signals indicative of a temperature of the one or more inverter blocks to a control device. If an individual inverter block has a temperature that is higher than the temperature of the other blocks, or if the temperature is above a threshold temperature, the switching patterns can be rotated among the plurality of inverter blocks based at least in part on the temperature measurements, such as, for example, by rotating a switching pattern wherein a comparatively lower power is processed to the individual inverter block with the higher temperature. Similarly, inverter blocks with lower temperatures can be controlled by a switching pattern in which comparatively more power is processed. In this way, the switching patterns can be rotated among the plurality of inverter blocks based at least in part on one or more signals indicative of a temperature of the one or more inverter blocks.

Figure 7:
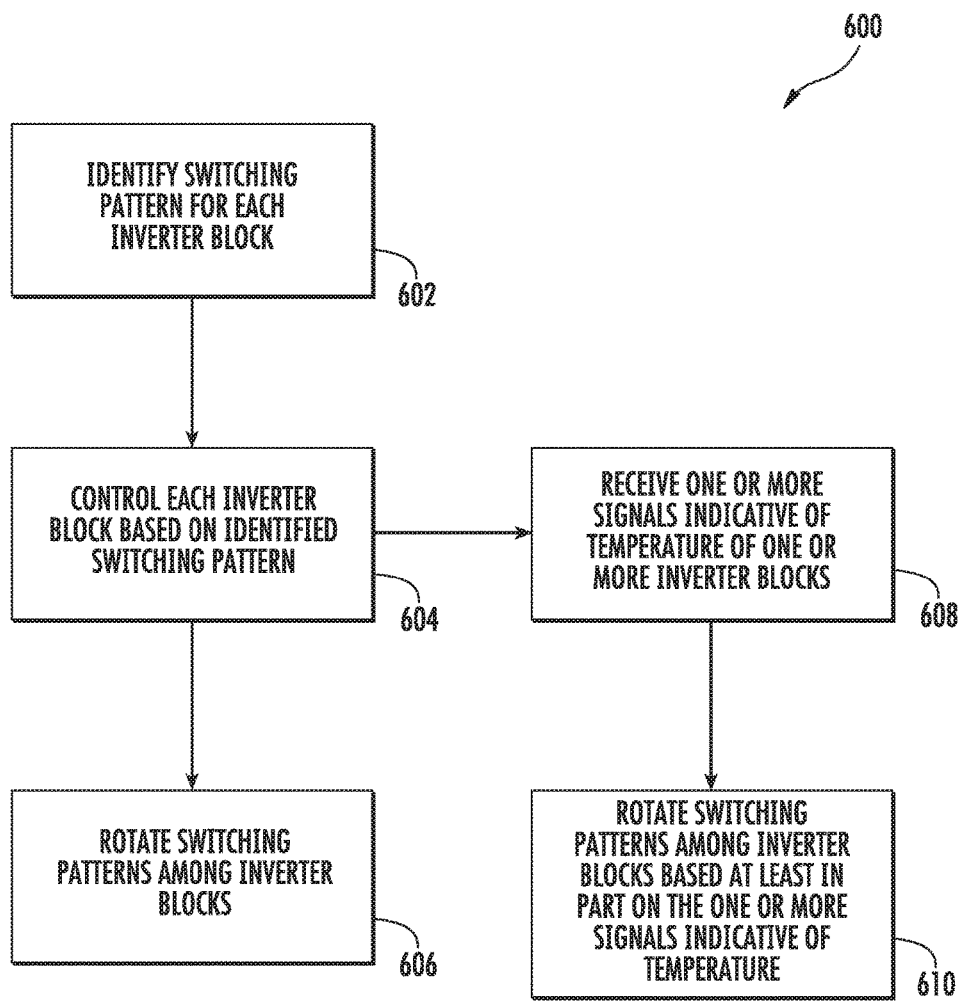
FIG. 7 depicts an example method according to example aspects of the present disclosure.

Referring now to FIG. 7, an example control method (600) for operating a DC to AC converter according to example aspects of the present disclosure is depicted. The DC to AC converter can include a plurality of inverter blocks. Each inverter block can include one or more SiC MOSFETS. For example, each inverter block can be a DC to DC to AC inverter block, which can include a first conversion entity, a second conversion entity, a third conversion entity, and an isolation transformer. Each conversion entity can include a plurality of bridge circuits, which can include one or more SiC MOSFETS. The DC to AC converter can be, for example, a line side converter 168 in a wind power generation system 100.

At (602), for each inverter block, the method (600) can include identifying one of a plurality of switching patterns for operation of the inverter block. Each switching pattern can include a plurality of switching commands. For example, each switching pattern can include an inner converter on/off command 404 and/or an outer converter duty cycle command 406. Each inverter block, such as an inverter block 206, can have an identified switching pattern, such as an identified switching pattern 402, assigned to the inverter block.

At (604), the method (600) can include controlling each inverter block based on the identified switching pattern for the inverter block. For example, a control device 174 or a control system 176 can be configured to control one or more switching devices, such as one or more SiC MOSFETs, based on the identified switching pattern to allow power to flow through the inverter block. Further, the plurality of inverter blocks can be controlled to generate a desired output waveform, such as by using a PWM switching pattern for at least one of the inverter blocks, as described herein.

At (606), the method (600) can include rotating the switching patterns among the plurality of inverter blocks. For example, each inverter block, such as an inverter block 206A-F, can have an identified switching pattern 402A-F. The identified switching patterns 402A-F can be rotated among the inverter blocks 206A-F by, for example, rotating the plurality of identified switching patterns 402A-F among each inverter block 206A-F at successive intervals, such as at every half cycle. For example, as depicted in FIG. 5, the identified switching patterns 402A-F can be rotated among inverter blocks 206A-F at successive intervals. In an embodiment, the identified switching patterns 402 can be rotated between two or more inverter blocks 206. For example, as depicted in FIG. 6, a first identified switching pattern 402A and a sixth identified switching pattern 402F can be rotated among a first inverter block 206A and a sixth inverter block 206F at successive intervals, such as every half cycle. In an embodiment, the switching patterns can be rotated among the plurality of inverter blocks such that the average power processed by each inverter block is approximately equal.

At (608), the method (600) can include receiving one or more signals indicative of temperature of one or more inverter blocks. For example, one or more temperature sensors can be configured to sense a temperature associated with one or more inverter blocks in a power converter. For example, each inverter block can have an associated temperature sensor configured to measure a temperature at each inverter block. A control device or a control scheme can be configured to receive the one or more signals indicative of a temperature of the one or more inverter blocks from the one or more temperature sensors.

At (610), the method (600) can include rotating the switching patterns among the plurality of inverter blocks based at least in part on the one or more signals indicative of a temperature of the one or more inverter blocks. For example, a power converter can include a plurality of inverter blocks, such as six inverter blocks 206A-F. Each inverter block 206A-F can have a temperature sensor associated with the inverter block and configured to measure a temperature of the inverter block. A signal indicative of a temperature of an inverter block, such as a temperature indicating a first inverter block 206A is higher than the temperature of inverter blocks 206B-F, can be used by a control device 174 or a control system 176 to rotate the patterns among the plurality of inverter blocks 206A-F. For example, a control device 174 or control system 176 can identify a switching pattern 402A for the first inverter block 206A wherein the average power processed is less than the average power in the other switching patterns in the plurality of switching patterns. The control device 174 or control system 176 can rotate the plurality of switching patterns among the inverter blocks 206A-F such that the inverter block 206A is controlled by the switching pattern 402A. In this way, the control device 174 or control system 176 can rotate the switching patterns among the plurality of inverter blocks based at least in part on the one or more signals indicative of a temperature of the one or more inverter blocks, and more specifically, rotate the switching patterns to change a temperature of the one or more building blocks.

Figure 8:
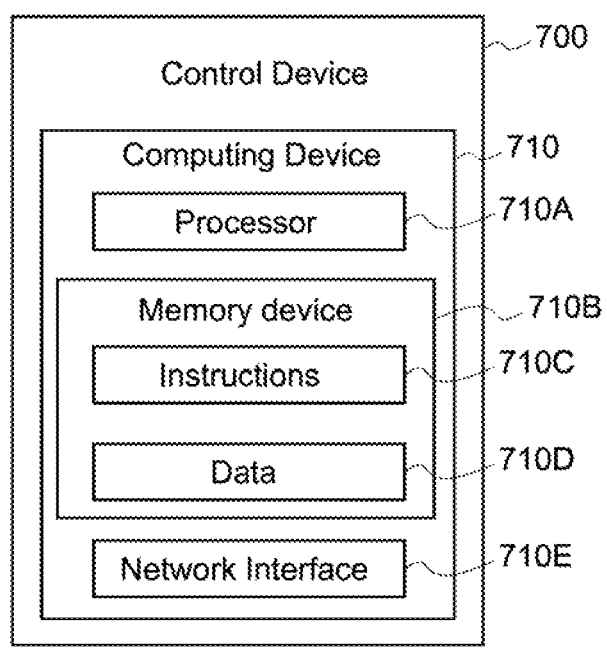
FIG. 8 depicts elements suitable for use in a control device according to example aspects of the present disclosure

FIG. 8 depicts an example control device 700 according to example embodiments of the present disclosure. The control device 700 can be used, for example, as a control device 174 or a control system 176 in a wind power generation system 100. The control device 700 can include one or more computing device(s) 710. The computing device(s) 710 can include one or more processor(s) 710A and one or more memory device(s) 710B. The one or more processor(s) 710A can include any suitable processing device, such as a microprocessor, microcontrol device, integrated circuit, logic device, and/or other suitable processing device. The one or more memory device(s) 710B can include one or more computer-readable media, including, but not limited to, non-transitory computer-readable media, RAM, ROM, hard drives, flash drives, and/or other memory devices.

The one or more memory device(s) 710B can store information accessible by the one or more processor(s) 710A, including computer-readable instructions 710C that can be executed by the one or more processor(s) 710A. The instructions 710C can be any set of instructions that when executed by the one or more processor(s) 710A, cause the one or more processor(s) 710A to perform operations. In some embodiments, the instructions 710C can be executed by the one or more processor(s) 710A to cause the one or more processor(s) 710A to perform operations, such as any of the operations and functions for which the computing system 700 and/or the computing device(s) 710 are configured, the operations for controlling a DC to AC converter (e.g., method 600), as described herein, and/or any other operations or functions of the one or more computing device(s) 710. The instructions 710C can be software written in any suitable programming language or can be implemented in hardware. Additionally, and/or alternatively, the instructions 710C can be executed in logically and/or virtually separate threads on processor(s) 710A. The memory device(s) 710B can further store data 710D that can be accessed by the processor(s) 710A. For example, the data 710D can include data indicative of power flows, current flows, temperatures, actual voltages, nominal voltages, gating commands, switching patterns, and/or any other data and/or information described herein.

The computing device(s) 710 can also include a network interface 710E used to communicate, for example, with the other components of system 700 (e.g., via a network). The network interface 710E can include any suitable components for interfacing with one or more network(s), including for example, transmitters, receivers, ports, control devices, antennas, and/or other suitable components. For example, the network interface 710E can be configured to communicate with one or more sensors in a wind power generation system 100, such as one or more voltage sensors or temperature sensors. Further, the network interface 710 can be configured to communicate with a control system, such as a control system 176, or control device, such as a control device 174.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The present disclosure is discussed with reference to DFIG power generation systems including a power converter utilizing SiC MOSFETs for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for operating a DC to AC converter, the DC to AC converter comprising a plurality of inverter blocks, each inverter block comprising a plurality of switching devices, the method comprising:
    for each inverter block, identifying one of a plurality of switching patterns for operation of the inverter block, each switching pattern comprising a plurality of switching commands, wherein each inverter block of the plurality of inverter blocks comprises an inner converter and an outer converter, and wherein the plurality of switching commands comprises: an inner converter on/off command to allow or disallow a flow of power through the inner converter, and an outer converter duty cycle command to control an output voltage of the outer converter, wherein the outer converter duty cycle command comprises a PWM switching pattern and a non-PWM switching pattern;
    controlling each inverter block based on the identified switching pattern for the inverter block such that, at a given point in time, one inverter block of the plurality of the inverter blocks regulates a line current of the DC to AC converter, wherein controlling each inverter block comprises applying the outer converter duty cycle command to each inverter block, and wherein applying the outer converter duty cycle command to each inverter block comprises:
        applying, at the given point in time, the PWM switching pattern to the one inverter block such that the line current from the DC to AC converter is regulated by the inverter block; and
        applying, at the given point in time, the non-PWM switching pattern to all other inverter blocks such that the all other inverter blocks output either a zero voltage or a full positive or negative voltage; and
    rotating the plurality of switching patterns among the plurality of inverter blocks, wherein the inverter blocks in the plurality of inverter blocks are connected in series with each other at an AC side of the DC to AC converter.

2. The control method of claim 1, wherein at least one of the plurality of switching devices comprises a silicon carbide MOSFET.

3. The control method of claim 1, wherein rotating the plurality of switching patterns among the plurality of inverter blocks comprises rotating the plurality of switching patterns among the plurality of inverter blocks every half cycle.

4. The control method of claim 1, further comprising:
    receiving, one or more signals indicative of a temperature of one or more inverter blocks in the plurality of inverter blocks; and
    wherein rotating the plurality of switching patterns among the plurality of inverter blocks comprises rotating the plurality of switching patterns among the plurality of inverter blocks based at least in part on the one or more signals indicative of a temperature of the one or more inverter blocks.

5. The control method of claim 1, wherein rotating the plurality of switching patterns among the plurality of inverter blocks comprises rotating the plurality of switching patterns among the plurality of inverter blocks such that average power processed by each inverter block is approximately equal.

6. The control method of claim 1, wherein the plurality of inverter blocks comprises a plurality of DC to DC to AC inverter blocks.

7. The control method of claim 6, wherein each of the plurality of DC to DC to AC inverter blocks comprises a first conversion entity, a second conversion entity, a third conversion entity, and an isolation transformer;
    wherein the first conversion entity is a first DC to AC conversion entity;

wherein the second conversion entity is an AC to DC conversion entity;
wherein the isolation transformer is coupled between the first conversion entity and the second conversion entity; and
wherein the third conversion entity is a second DC to AC conversion entity.

8. The control method of claim 1, wherein the DC to AC converter comprises a multiphase DC to AC converter, wherein the control method is performed for each phase of multiphase power converted by the multiphase DC to AC converter.

9. A power conversion system, comprising:
a DC to AC converter comprising a plurality of inverter blocks, each inverter block of the plurality of inverter blocks comprising an inner converter and an outer converter having one or more silicon carbide MOSFETs, wherein the inverter blocks in the plurality of inverter blocks are connected in series with each other at an AC side of the DC to AC converter, and
a control system coupled to the DC to AC converter and configured to:
identify one of a plurality of switching patterns for operation of each inverter block, each switching pattern comprising a plurality of switching commands, wherein the plurality of switching commands comprises: an inner converter on/off command to allow or disallow a flow of power through the inner converter, and an outer converter duty cycle command to control an output voltage of the outer converter, wherein the outer converter duty cycle command comprises a PWM switching pattern and a non-PWM switching pattern;
control each inverter block based on the identified switching pattern for the inverter block such that, at a given point in time, one inverter block of the plurality of the inverter blocks regulates a line current of the DC to AC converter, wherein to control each inverter block the control system is configured to:
apply, at the given point in time, the PWM switching pattern to the one inverter block such that the line current from the DC to AC converter is regulated by the inverter block; and
apply, at the given point in time, the non-PWM switching pattern to all other inverter blocks such that the all other inverter blocks output either a zero voltage or a full positive or negative voltage; and
rotate the plurality of switching patterns among the plurality of inverter blocks.

10. The power conversion system of claim 9, wherein the control system is configured to rotate the plurality of switching patterns among the plurality of inverter blocks every half cycle.

11. The power conversion system of claim 9, wherein the control system is configured to receive one or more signals indicative of a temperature of one or more inverter blocks in the plurality of inverter blocks; and
wherein the control system is configured to rotate the plurality of switching patterns among the plurality of inverter blocks based at least in part on the one or more signals indicative of a temperature of the one or more inverter blocks.

12. The power conversion system of claim 9, wherein the control system is configured to rotate the plurality of switching patterns among the plurality of inverter blocks such that average power processed by each inverter block is approximately equal.

13. The power conversion system of claim 9, wherein the inner converter comprises a first DC to AC conversion entity and an AC to DC conversion entity coupled to each other via an isolation transformer, and wherein the outer converter comprises a second DC to AC conversion entity.

14. A wind power generation system, comprising:
a wind power generator configured to generate AC power;
an AC to DC converter coupled to the wind power generator, the AC to DC converter configured to convert the AC power from the wind power generator to a DC power;
a DC link coupled to the AC to DC converter, the DC link configured to receive DC power from the AC to DC converter;
a DC to AC converter coupled to the DC link, the DC to AC converter configured to receive DC power from the DC link; the DC to AC converter comprising a plurality of inverter blocks, wherein the inverter blocks in the plurality of inverter blocks are connected in series with each other at an AC side of the DC to AC converter, each inverter block of the plurality of inverter blocks comprises an inner converter and an outer converter having one or more silicon carbide MOSFETs; and
a control system coupled to the DC to AC converter, wherein the control system is configured to:
identify one of a plurality of switching patterns for operation of each inverter block, each switching pattern comprising a plurality of switching commands, wherein the plurality of switching commands comprises: an inner converter on/off command to allow or disallow a flow of power through the inner converter, and an outer converter duty cycle command to control an output voltage of the outer converter, wherein the outer converter duty cycle command comprises a PWM switching pattern and a non-PWM switching pattern;
control each inverter block based on the identified switching pattern for the inverter block such that, at a given point in time, one inverter block of the plurality of the inverter blocks regulates a line current of the DC to AC converter, wherein to control each inverter block the control system is configured to:
apply, at the given point in time, the PWM switching pattern to the one inverter block such that the line current from the DC to AC converter is regulated by the inverter block; and
apply, at the given point in time, the non-PWM switching pattern to all other inverter blocks such that the all other inverter blocks output either a zero voltage or a full positive or negative voltage; and
rotate the plurality of switching patterns among the plurality of inverter blocks.

15. The wind power generation system of claim 14, wherein the control system is configured to rotate the plurality of switching patterns among the plurality of inverter blocks every half cycle.

16. The wind power generation system of claim 14, wherein the inner converter comprises a first DC to AC conversion entity and an AC to DC conversion entity coupled to each other via an isolation transformer, and wherein the outer converter comprises a second DC to AC conversion entity.

* * * * *